United States Patent
Pawar et al.

(10) Patent No.: US 9,867,199 B1
(45) Date of Patent: Jan. 9, 2018

(54) DYNAMIC CONTROL OF AIR INTERFACE CAPACITY

(71) Applicant: Sprint Spectrum L.P., Overland Park, KS (US)

(72) Inventors: Hemanth B. Pawar, Brambleton, VA (US); Shilpa K. Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 36 days.

(21) Appl. No.: 15/016,516

(22) Filed: Feb. 5, 2016

(51) Int. Cl.
*H04W 72/00* (2009.01)
*H04W 72/04* (2009.01)
*H04W 28/02* (2009.01)
*H04L 5/00* (2006.01)

(52) U.S. Cl.
CPC ....... *H04W 72/0486* (2013.01); *H04L 5/0035* (2013.01); *H04W 28/0205* (2013.01); *H04W 28/0268* (2013.01)

(58) Field of Classification Search
CPC ..... H04W 36/14; H04W 28/10; H04W 88/16; H04W 88/06; H04W 16/14; H04W 28/0268; H04W 28/0289
USPC ....... 455/509, 442, 436, 73, 517, 446, 550.1
See application file for complete search history.

(56) References Cited

U.S. PATENT DOCUMENTS

| | | | |
|---|---|---|---|
| 8,140,079 B2* | 3/2012 | Olson | H04W 36/32 455/436 |
| 2004/0068668 A1* | 4/2004 | Lor | H04L 63/107 726/15 |
| 2008/0004028 A1* | 1/2008 | Vincent | H04W 16/00 455/446 |
| 2017/0019793 A1* | 1/2017 | Mitsui | H04W 16/08 |

* cited by examiner

*Primary Examiner* — Joseph Arevalo (57) ABSTRACT

A method and system for managing capacity of a base station's air interface. The base station identifies a served user equipment device (UE) based at least in part on the UE being located in an area of overlap between coverage of the base station and coverage of another base station. The base station then increases an order of modulation of air interface communication between the base station and the identified UE, so as to help free up some air interface capacity. Further, in view of the possible decrease in reliability of communication due to the increased order of modulation, the base station may also invoke use of Coordinated Multipoint Communication (CoMP) for the UE to help improve air interface communication between the base station and the UE.

19 Claims, 5 Drawing Sheets

Example CQI-MCS Mapping Table

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Example CQI-MCS Mapping Table

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Fig. 5 ately operated by a human user), can operate. In turn, each base station may be coupled with network infrastructure, including one or more gateways and switches, that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.
DYNAMIC CONTROL OF AIR INTERFACE CAPACITY

BACKGROUND

Unless otherwise indicated herein, the description provided in this section is not itself prior art to the claims and is not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices (whether or not technically operated by a human user), can operate. In turn, each base station may be coupled with network infrastructure, including one or more gateways and switches, that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

When a cellular wireless network serves UEs, the network may allocate various resources to facilitate communication to and from the UEs. In an example arrangement, for instance, the network may allocate "bearers" that define physical or logical communication channels extending between the UEs and a transport network. Each such bearer may include a radio-bearer component that extends between a UE and a serving base station and an access-bearer component that extends between the serving base station and the transport network. Further, each such bearer may have an associated service level, such as "best effort" or "guaranteed bit rate" for instance, to support a particular quality of service or type of service. In practice, the network may then allocate a number of such bearers for a UE, to support various different types of communication services.

By way of example, when the UE first enters into coverage of a base station, the UE may engage in a registration or "attachment" process that causes the network to allocate for the UE certain default bearers in accordance with the UE's service profile. For instance, if the UE's service profile indicates that the UE supports general packet-data communication (such as web browsing, file transfer, and the like), the network may allocate for the UE a default bearer for carrying such communications with a best-effort service level. Further, if the UE's service profile indicates that the UE supports voice over Internet Protocol (VoIP) communications or other such real-time packet-based communication service, the network may allocate for the UE a default bearer to support Session Initiation Protocol (SIP) signaling or the like to facilitate setup of such communications.

In turn, as a UE is being served by a base station, if the UE is going to engage in another type of communication service, the network may allocate for the UE still other bearers, possibly with other service levels. For instance, if the UE supports VoIP service and seeks to engage in a VoIP call, or a VoIP call server seeks to connect a call to the UE, the network may allocate for the UE a dedicated bearer having a guaranteed bit rate and perhaps other high service level attributes, to carry the VoIP bearer traffic (e.g., packets representing voice), and the UE may then engage in the VoIP call via that bearer. Further, if the UE supports online gaming service and seeks to engage in gaming communication, the network may allocate for the UE a dedicated bearer having a particular service level appropriate for that gaming communication, and the UE may then engage in the gaming via that bearer.

Each bearer that the network allocates to a UE may have an associated quality of service class indicator (QCI) or other indication of the bearer's service level. For instance, a bearer for carrying VoIP bearer traffic may have a QCI of 1, a bearer for carrying SIP signaling or the like may have a QCI of 5, and bearer for carrying best-effort traffic may have a QCI of 8 or 9. When a base station serves a UE, the base station may maintain a context record for the UE, identifying each bearer that the UE has, and specifying the QCI level and/or other attributes of the bearer, for reference by the base station to help ensure appropriate service of the UE.

In a typical cellular wireless network, each of a base station's coverage areas will operate on one or more carrier frequencies and will define various channels for carrying control and bearer data between the base station and the UEs served by the base station. The base station may then manage communication of packet data to and from served UEs over the air interface. For instance, as the base station receives packet data from the network infrastructure for transmission to UEs on various bearers, the base station may queue the data, schedule use of particular downlink air interface resources (e.g., channels, resource blocks, or the like) to carry the data, and transmit the data on the scheduled resources to the destination UEs. Likewise, as UEs have data to transmit on various bearers, the base station may schedule use of particular uplink air interface resources to carry the data, and the UEs may transmit the data on the scheduled uplink resources to the base station.

OVERVIEW

In practice, the air interface over which a base station serves UEs will have a limited capacity to carry control and bearer data to and from served UEs. As a result, there may be times when the air interface becomes so loaded (congested) that the base station cannot serve UEs with sufficient quality of service. For example, if the air interface becomes very loaded, the base station may be unable to meet the throughput requirements for certain guaranteed-bit-rate bearers, and the base station may even be unable to meet a minimum throughput floor requirement for best-effort bearers.

In accordance with the present disclosure, a base station will be configured to dynamically increase air interface capacity by reducing the extent of air interface resources that the base station uses to serve one or more particular UEs. The base station will do this by increasing the modulation order used for air interface communication between the base station and each such UE, so that a given extent of data can be communicated between the base station and UE using fewer air interface resources, thus freeing up some air interface capacity for other use, such as to serve one or more other UEs.

The modulation order used for air interface communication between a base station and a UE could be a particular modulation and coding scheme (MCS), which may define a modulation scheme used for representing data on physical air interface resources and perhaps further a code rate for the underlying data being communicated. The code rate may define how many redundancy bits are added to the data being communicated so as to produce a coded bit stream for transmission over the air, with a lower code rate meaning more redundancy bits are added, and vice versa. The modulation scheme may then define how many bits of the coded bit stream are represented by each symbol carried by a physical air interface resource element. Examples of modulation schemes include (i) Quadrature Phase Shift Keying (QPSK), which represents 2 bits per symbol, (ii) 16 Quadrature Amplitude Modulation (16QAM), which represents 4 bits per symbol, and (iii) 64QAM, which represents 6 bits per symbol.

Figure 1:
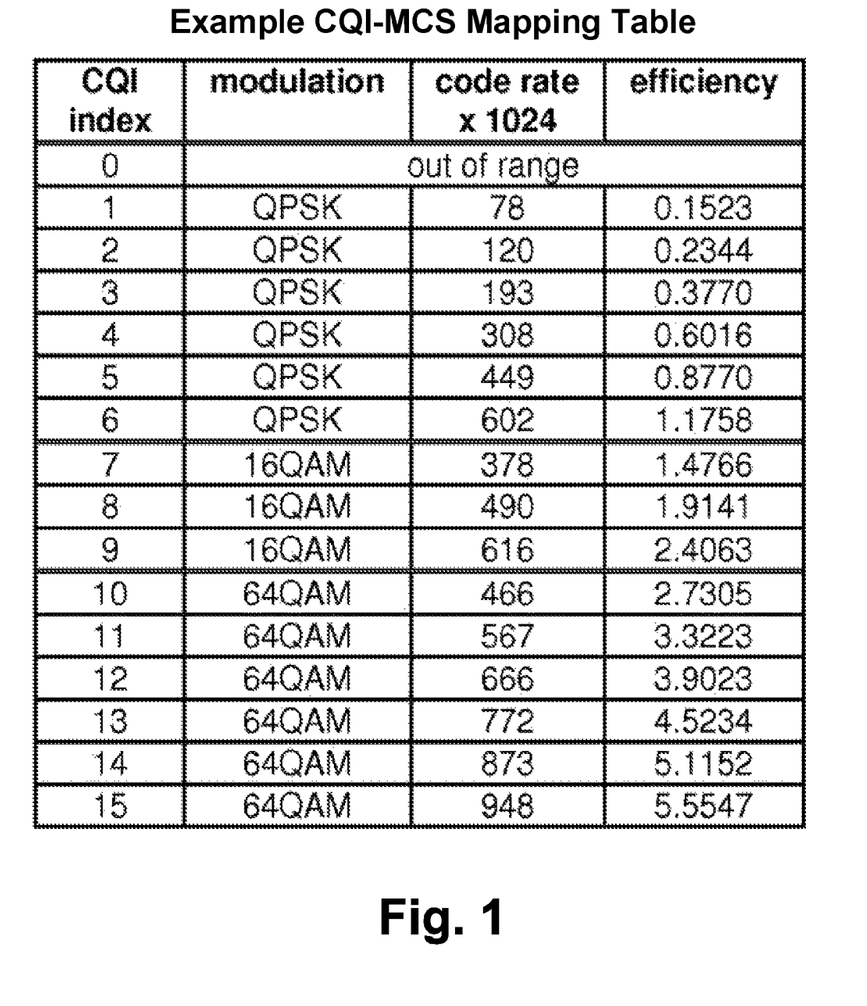
FIG. 1 is a standard table mapping CQI to MCS.

Typically when a UE has poor air interface channel conditions (e.g., when the UE is in poor coverage of the base station), a lower order MCS may be more reliable (e.g., less susceptible to errors and lost data) than a higher order MCS, since the lower order MCS may have more redundancy bits and may provide fewer bits per air physical interface resource element. Consequently, in normal practice, when a base station is serving a UE, the base station may be configured to impose use of an MCS selected based on the UE's channel quality, with the order of modulation being largely proportional to the UE's channel quality (namely, higher order MCS as the channel quality is better, and vice versa). For instance, in a Long Term Evolution (LTE) system, a base station may receive reports of a UE's channel quality each represented by a channel quality indicator (CQI) index, and the base station may apply a standard CQI-to-MCS mapping table that correlates CQI indexes to MCSs, ranging from a lowest CQI index correlated with a lowest order MCS, to a highest CQI index correlated with a highest order MCS, as shown by way of example in FIG. 1. Thus, in normal practice in LTE, a base station may impose use of an MCS selected based on the UE's channel quality in accordance with that mapping table.

Per the present disclosure, to increase air interface capacity, the base station may select a UE to have its modulation order increased to a level higher than the modulation order that the base station would normally apply in view of the UE's channel quality. For instance, in an LTE system, if the base station would normally apply the table of FIG. 1 to map the UE's CQI to a particular MCS, the base station could instead impose use of a higher MCS than that particular MCS. This may involve the base station imposing use of a higher code rate and/or use of a modulation scheme in which each physical air interface symbol represents a greater number of bits. In this way, the base station may thereby free up some air interface capacity for other use.

By increasing the modulation order used for air interface communication with a UE, however, a further problem may arise. Namely, the increased modulation order used for air interface communication with the UE may decrease the reliability of air interface communication between the base station and the UE, since the higher modulation order may pose a higher risk of error and data loss given the UE's channel quality.

To account for this possible decrease in reliability resulting from use of a higher modulation order for communication with the UE, the present disclosure further provides for taking this action specifically with respect to a UE whose air interface communication could be improved in another way to help compensate for the decreased reliability. In particular, the disclosure provides for the base station selecting the UE based on the UE being in an area of overlap between the base station's coverage and coverage provided by a neighboring base station, so that the base station can engage in the assistance of the neighboring base station in communicating with the UE using Coordinated Multipoint Communication (CoMP) or the like.

With CoMP, the base station's communication with the UE (to and/or from the UE) may flow not only directly over the air between the base station and the UE but also via the neighboring base station. For instance, for downlink communication, the base station may not only schedule and engage in data transmission to the UE directly but may also cause the neighboring base station to transmit the same data on the same frequency at the same time, so as to help improve the UE's receipt of the data. And for uplink communication, the base station may not only schedule and receive data transmission from the UE directly but may also receive from the neighboring base station the UE's transmission, to help improve the base station's receipt of the data.

Thus, per the present disclosure, when a base station wishes to increase air interface capacity, the base station may identify one or more UEs based on each identified UE being located within an overlap of coverage between the base station's coverage and a neighboring base station's coverage, and the base station may then increase modulation order for its air interface communication with each identified UE. Further, to help offset the possible resulting decrease in reliability of air interface communication between the base station and each such UE, the base station may also invoke use of CoMP or the like for each such UE. In this manner, the base station may thereby help to increase air interface capacity while also helping to offset the potentially adverse impact on each selected UE.

Accordingly, in one respect, disclosed is a method operable in a wireless communication system that includes a first base station that provides a first wireless coverage area and a second base stations that provides a second wireless coverage area partially overlapping with the first wireless coverage area. The method provides for managing capacity of the first wireless coverage area and includes (i) determining that UE served by the first base station is located where the first wireless coverage area partially overlaps with the second wireless coverage area and (ii) based at least in part on the determining that the UE served by the base station is located where the first wireless coverage area partially overlaps with the second wireless coverage area, increasing an order of modulation of data communication between the first base station and the UE. As discussed above, increasing the order of modulation may thus help to free up air interface resources of the first wireless coverage area by using fewer air interface resources of the first wireless coverage area to carry a given quantity of data between the first base station and the UE.

Furthermore, in line with the discussion above, the method may additionally involve taking action to help compensate for the increased modulation order (and thus possibly decreased reliability of air interface communication with the UE). In particular, in view of the increase in order of data modulation between the first base station and the UE when the UE is located where the first wireless coverage area overlaps with the second wireless coverage area, the method may additionally involve the first base station applying CoMP for the UE. As discussed above, applying CoMP for the UE may help to improve communication between the first base station and the UE.

In another respect, disclosed is a method operable by a first base station to manage air interface capacity in a first wireless coverage area provided by the first base station. According to the method, the first base station encounters a trigger for increasing capacity of the first wireless coverage areas. Further, responsive to the encountering the trigger, the first base station selects a UE served by the first base station in the first wireless coverage area, with the selecting being based on the selected UE being within an area of overlap between the first wireless coverage area and second wireless coverage are provided by a second base station. And based on the selecting, the method then involves (i) increasing an order of modulation of communication between the first base station and the selected UE, which may help free up air interface resources in the first wireless coverage area, and (ii) invoking application of CoMP for the selected UE, which may help improve (e.g., compensate for reduction in reliability of) communication between the base station and the selected UE.

Still further, disclosed is a base station having a wireless communication interface comprising an antenna structure and wireless transceiver, operable to provide a first wireless coverage area in which to serve UEs, and a controller comprising a processing unit programmed with instructions executable to cause the base station to carry out operations such as those discussed above.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

For purposes of illustration, the present disclosure will focus on implementation in the context of LTE. However, it should be understood that the disclosed principles can be applied with respect to numerous other technologies, and that numerous variations from arrangements and operations described may therefore be possible, while remaining within the scope of the claims.

Figure 2:
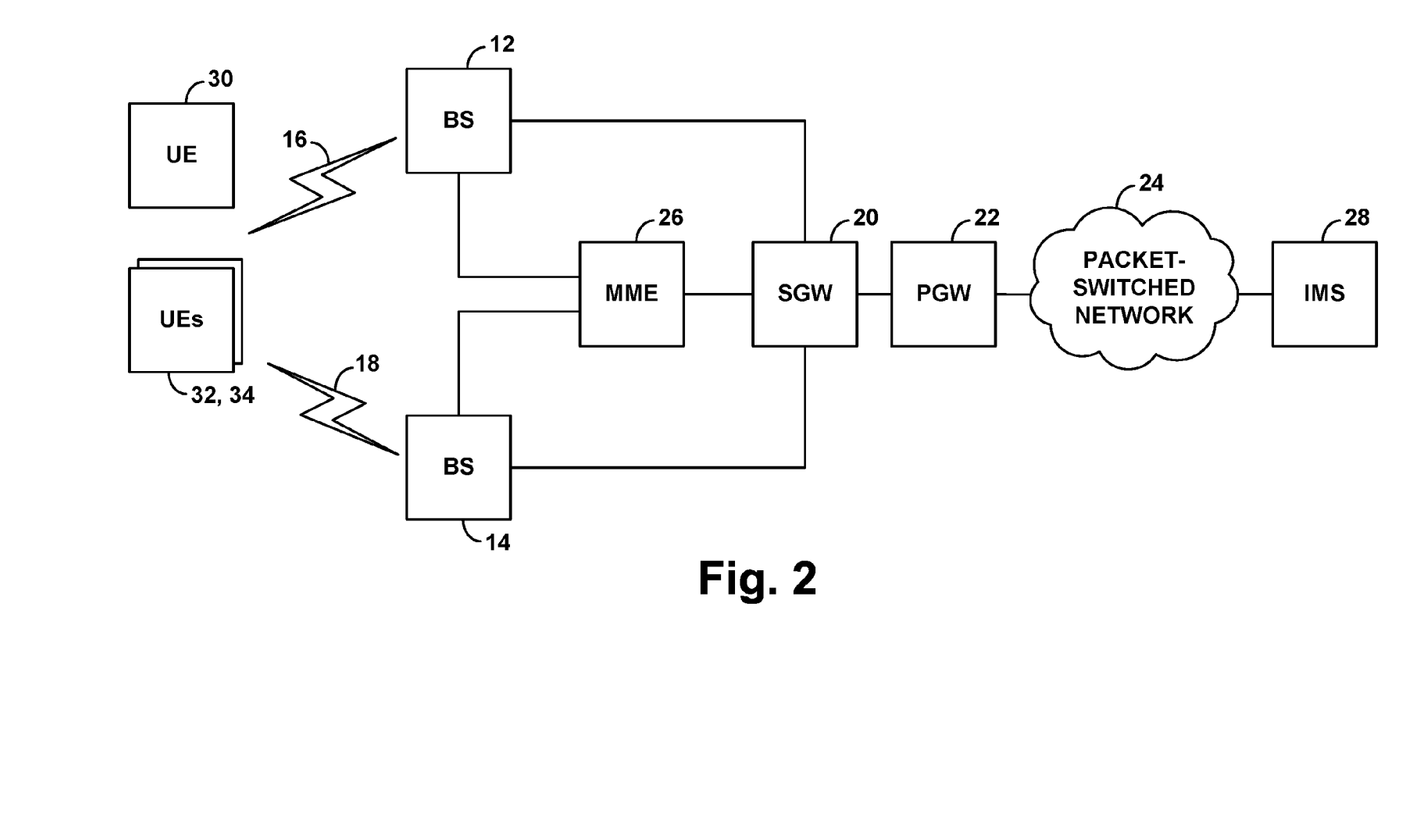
FIG. 2 is a simplified block diagram of a network arrangement in which aspects of the present disclosure can be implemented.

Referring to the drawings, as noted above, FIG. 2 is a simplified block diagram of an example network arrangement in which aspects of the disclosure can be implemented. As shown in FIG. 2, the network arrangement includes two representative base stations (e.g., LTE evolved node Bs (eNodeBs)) 12, 14, each radiating to provide a respective wireless coverage area 16, 18 in which to serve UEs, and having a communication interface with each other. Each base station then has a respective communication interface with a serving gateway (SGW) 20, and the SGW has a communication interface with a packet-data network gateway (PGW) 22 that provides connectivity with a packet-switched network 24 such as the Internet. In addition, the LTE network includes a mobility management entity (MME) 26, which has a communication interface with each base station and with the SGW and which functions to carry out various signaling and control operations in the network. Further, shown sitting on network 24 is a representative Internet Multimedia Subsystem (IMS) 28, which may be configured to support VoIP call service and other packet-based real-time media service for UEs.

In practice in the arrangement of FIG. 2, base station 12 may be serving a plurality of UEs, three of which are shown by way of example as UE's 30, 32, 34. In the example arrangement, UE 30 is in coverage of just base station 12, whereas UEs 32 and 34 are in an area of overlap between the coverage of base station 12 and the coverage of base station 14, and thus UEs 32 and 34 may be at an edge of coverage provided by their serving base station 12.

Each of these UEs may have a Radio Resource Control (RRC) connection defining an established radio link between the UE and base station 12. Further, in line with the discussion above, each UE may have one or more established bearers for engaging in data communication via PGW 22, with each bearer logically extending between the UE and the base station 12 and via the base station 12 and the SGW 20, and each bearer having a particular expected service level defined by QCI level, service level agreement (SLA), or the like. In an example scenario, for instance, each UE may have a default QCI 9 bearer for engaging in general Internet communication, and UE 28 may also have a default QCI 5 bearer for engaging in SIP signaling with IMS 28 and a dedicated QCI 1 bearer for engaging in VoIP communication with IMS 28.

As noted above, each of these bearers may have a defined service level such as a guaranteed or minimum bit rate for instance. Further, VoIP or other such real-time media communications with IMS or other entities may also have certain minimum service level expectation or requirement, possibly regardless of bearer service level. For instance, it may be desirable for VoIP communication to occur at a certain minimum bit rate to help ensure an acceptable level of voice quality (e.g., per a mean opinion score).

Under LTE, the air interface over which each base station serves UEs may span a particular frequency bandwidth and be divided over time into a continuum of 1-millisecond transmission time intervals (TTIs), with each TTI being divided over time into a number of 66.67-microsecond symbol segments, and defining over the frequency bandwidth a number of 15-kHz subcarriers. With this arrangement, each TTI defines an array of physical resource elements each at a particular subcarrier and particular symbol segment. And as noted above, each resource element may then be used to carry a modulation symbol that represents a particular number of bits of data, with the number being defined by an applicable modulation scheme. Certain ones of these resource elements per TTI may then cooperatively define one or more control channel for carrying control signaling between the base station and served UEs, and other resource elements per TTI may be grouped to form physical resource blocks (PRBs) cooperatively defining a shared channel for carrying scheduled data transmissions between the base station and served UEs.

As a base station 12 serves UEs, the base station may receive from SGW 20 packet data (e.g., IP packets) destined to particular UEs, possibly routed from network 24, and may queue those packets for downlink air interface transmission. Each packet may be marked in a header with a Differential Services Point Code (DSCP) value indicating the QCI level of the packet or otherwise indicating which bearer of the UE the packet is being transmitted on and/or what the required or desired service level is for handling the packet. The base station may then schedule and engage in downlink transmission of the queued packets to their destination UEs. In particular, to the extent air interface capacity permits, and considering the service level requirements of the data at issue, the base station may decide to transmit at least some of the data in certain PRBs of a TTI and may transmit on a control channel of that TTI a scheduling directive (Downlink Control Information (DCI) message) specifying the destination UE, the PRB(s), and an MCS to be used for the transmission, and the base station may transmit the data in the specified PRBs using the specified MCS. The destination UE may then receive the scheduling directive and accordingly receive the data from the specified PRBs and demodulate and decode the data.

Likewise, as a UE served by base station 12 has packet data to transmit to the base station, the UE may transmit a scheduling request to the base station for a particular bearer, and the base station may then schedule uplink transmission of the data from the UE. In particular, to the extent air interface capacity permits, and considering the service level requirements of the data at issue, the base station may allocate PRBs in an upcoming TTI and may transmit to the UE a DCI message specifying the PRBs and an MCS to be used for the transmission. The UE may then transmit the data to the base station in the specified PRBs of the upcoming TTI, using the specified MCS, and the base station may receive the transmission, demodulate and decode the data, and forward the underlying packet data to the SGW for transmission ultimately on network 24 to an indicated destination.

In practice as noted above, each served UE may also regularly provide base station 12 with a channel quality report indicating a quality of the UE's channel of communication with the base station for instance. For instance, a UE may periodically determine a CQI index based on factors such as strength of transmissions from the base station, radio capabilities of the UE, and the like. And the UE may transmit that CQI index and/or other channel quality metric information via an uplink control channel and/or shared channel to the base station. Based on such channel quality reports and/or other metrics (possibly evaluation of uplink conditions as well or instead), the base station may thereby keep track of the channel quality of each served UE. As noted above, as the base station schedules data transmission to or from a UE, the base station may then determine an MCS to apply based on the UE's channel quality, such as by reference to the table of FIG. 1 for instance. That determined MCS could thus be considered a baseline MCS or modulation order for the UE, which may be increased in accordance with the present disclosure.

In addition, each served UE may also periodically, or in response to one or more other events, provide base station 12 with radio measurement reports, which may indicate the strength of the base station's coverage and strength of neighboring base station coverage detected by the UE. Such measurement reports could facilitate handover decisions, such as when the UE is in threshold weak coverage of its serving base station and threshold strong coverage of a neighboring base station.

In accordance with the present disclosure, base station 12 may decide to increase capacity of its air interface for various reasons.

For example, the base station may detect that one or more of its served UEs are not receiving a required or desired level of service and thus that it would be useful to increase capacity to help better serve each such UE. As a specific example of this, base station 12 may determine that UE 30 is communicating a particular type of content, such as by engaging in deep packet inspection of data flowing through the base station or by noting the associated QCI level of the UE's bearer, and the base station may determine that the rate of data flow to or from the UE for that communication does not meet a specified service level requirement or desire. As another example, the base station may receive a signal from another entity indicating that UE's data rate of communication is too low. For instance, if the UE is engaged in a VOID communication with IMS 28, the IMS could determine that the UE's data rate of communication is threshold low and could responsively signal to the base station, or perhaps to the MME or other entity to trigger signaling in turn to the base station.

As another example, the base station may simply determine that one or more of its served UEs is engaged in a particular type of communication, which could potentially benefit from increased capacity. For instance, the base station could determine that UE 30 is currently engaged in a VoIP call and could deem that a sufficient trigger for increasing capacity to help ensure that UE 30 receives sufficient throughput to provide a high level of voice quality.

Still further, as yet another example, the base station may evaluate utilization of its air interface in various ways, such as by considering quantity of UEs currently served, quantity of VoIP calls currently served, percentage of PRBs per TTI that have been recently allocated, and so forth, and could thereby determine that load (congestion) on the air interface is threshold high and thus that it would be beneficial to increase air interface capacity.

For these and/or other reasons, the base station may then select one or more of the base station's served UEs to have their MCS increased so as to help increase the base station's air interface capacity. As noted above, the base station would optimally select each such UE based on a determination that the UE is in an area of overlap between coverage of the base station and coverage of a neighboring base station such as base station 14, so that the base station could then potentially also invoke CoMP or the like for the UE to help compensate for a possible reduction in reliability resulting from using a higher than appropriate MCS for the UE. (The base station may also base this selection on other factors, such as consideration of the selected UE's service level or communication type for instance.) Thus, base station 12 in the example arrangement may select UEs 32 and 34 to have their MCS increased.

A base station could determine which of its served UEs are each located in such a coverage overlap in various ways. For example, the base station could refer to measurement reports recently provided by the UE to determine if the UE is detecting sufficient signal strength from a neighboring base station to indicate that the UE is in coverage of the neighboring base station. As another example, the base station could apply or consider any of a variety of location analysis techniques, such as Global Positioning System (GPS) reporting, for instance, to determine the location of each such UE and could programmatically compare the location with predefined coverage map data indicating where the area of overlap is, to determine that a UE is located with the overlap area.

For each such identified UE, the base station may then increase the MCS used for communication with the UE. For example, given the MCS that the base station would normally use for communication with the UE per the table of FIG. 1 for instance, the base station may determine that data communication between the base station and UE will use a particular higher order MCS, such as one or more steps higher in the example table or the next higher order modulation scheme in the table. And the base station may then serve the identified UE at that higher order MCS, by specifying the higher order MCS, rather than the normal MCS, in scheduling directives to the UE and so forth.

Further, again to help compensate for the possible reduction in reliability resulting from communicating with the UE at the higher than appropriate MCS, the base station may also invoke and thus apply CoMP or a similar process for communication with the UE—by engaging the assistance of the neighboring base station in whose coverage the UE is located. The base station may do this for uplink and/or downlink communication with the UE.

On the uplink, for instance, normally an LTE base station receives modulated signals transmitted from a served UE on particular air interface resource elements (i.e., at particular subcarriers and times), demodulates those signals to obtain their I/Q samples, and determines the UE's underlying coded data transmission based on those I/Q samples. With at least one form of uplink CoMP, a neighboring base station may also demodulate uplink signals on the same subcarriers at the same times to obtain I/Q samples and may transmit those I/Q samples to the serving base station, and the serving base station may then make use of those I/Q as well, to help improve the base station's determination of the underlying coded data transmission from the UE.

In practice, base station 14 may regularly provide base station 12 with I/Q samples for all signals that base station 14 receives. In that case, since UEs 32 and 34 are located in the overlap of coverage with base station 14, base station 12 may invoke application of uplink CoMP for UEs 32 and 34 by starting to use those received I/Q samples, along with those it obtained itself, to help improve determination of the underlying data transmissions from UEs 32 and 34. Alternatively, if base station 12 is not yet receiving such I/Q samples from base station 14, base station 12 could invoke application of uplink CoMP for UEs 32 and 34 by signaling to base station 14 to request base station 14 to start obtaining and providing the I/Q samples, and by starting to use those received I/Q samples, along with those it obtained itself, to help improve determination of the underlying data transmissions from UEs 32 and 34.

On the downlink, CoMP may involve a UE receiving the same transmission, on the same subcarriers and at the same time, from multiple base stations, which may similarly help the UE better determine the underlying data transmission. To invoke downlink CoMP for UEs 32 and 34, base station 12 may start providing base station 14 with data (or I/Q samples) that base station is going to transmit to those UEs, along with a directive of which resource elements are to carry the transmissions, and base station 14 may accordingly transmit to the UEs concurrently with the transmissions from base station 12, to help improve the UEs' determination of the underlying data transmissions.

Figure 3:
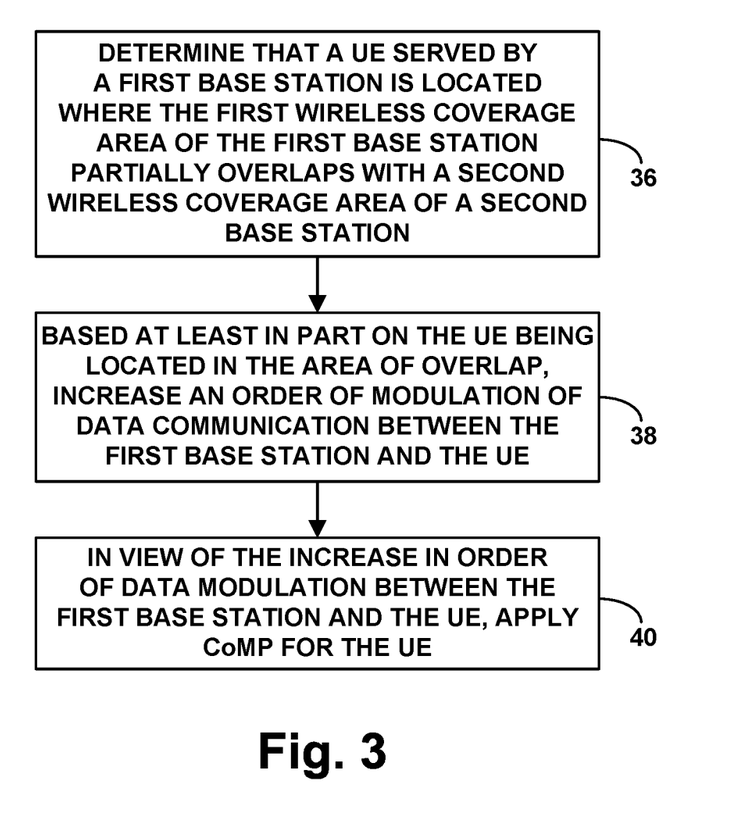
FIG. 3 is a flow chart depicting operations that can be carried out in accordance with the disclosure.

FIG. 3 is next a flow chart depicting an example method for managing capacity of a first wireless coverage area provided by a first base station in a wireless communication system. The method may be carried out by a base station such as base station 12 for instance, and/or by one or more other entities described herein. As shown in FIG. 3, at block 36, the method involves determining that a UE served by the first base station is located where the first wireless coverage area partially overlaps with a second wireless coverage area provided by a second base station of the wireless communication system. In practice, these base stations may be separately located. Alternatively, the base stations maybe co-located, and the first and second coverage areas might be separate sectors that partially overlap with each other. Other arrangements are possible as well.

At block 38, based at least in part on the determining that the UE served by the first base station is located where the first wireless coverage area partially overlaps with the second wireless coverage area, the method then involves increasing an order of modulation of data communication between the first base station and the UE. As discussed above, increasing the order of modulation may help to free up air interface resources of the first wireless coverage area by using fewer air interface resources of the first wireless coverage area to carry a given quantity of data between the first base station and the UE.

Further, at block 40, the method may additionally involve, in view of the increase in order of data modulation between the first base station and the UE when the UE is located where the first wireless coverage area overlaps with the second wireless coverage area, the first base station applying CoMP for the UE. And as discussed above, applying CoMP for the UE may involve making use of the second base station to communicate with the UE concurrently with the first base station communicating with the UE, and may help to improve communication between the first base station and the UE.

As further discussed above, the features of this process could be carried out in response to a decision to increase capacity of the first wireless coverage area to facilitate improved communication between the first base station and another UE served by the first base station. For example, the decision to increase capacity of the first wireless coverage area to facilitate improved communication between the first base station and the other UE could be in response to at least a determination that the second UE is not being served with a sufficiently high data rate, which could be determined through deep packet inspection by the first base station of packet data flowing to or from the other UE and/or by the first base station receiving a singling message indicating that the other UE is not being served with sufficiently high data rate. Alternatively, the decision to increase capacity of the first wireless coverage area could be in response to a determination that the other UE is engaged in a particular type of data communication, such as a VoIP call for instance.

If the first base station carries out this process with respect to one or more first UEs, increasing the modulation order for each first UE and applying CoMP to help compensate for possibly reduced reliability resulting from the increased modulation order, the first base station may then determine if air interface capacity is sufficient. For instance, the first base station could determine if the second UE is now being served with sufficiently high data rate, or if load is no longer threshold high. And if the first base station thereby determines that air interface capacity should still be increased further, then the first base station may carry out the process further with respect to the one or more first UEs (e.g., increase their modulation order further) and/or select and carry out the process additionally with respect to one or more other first UEs.

Figure 4:
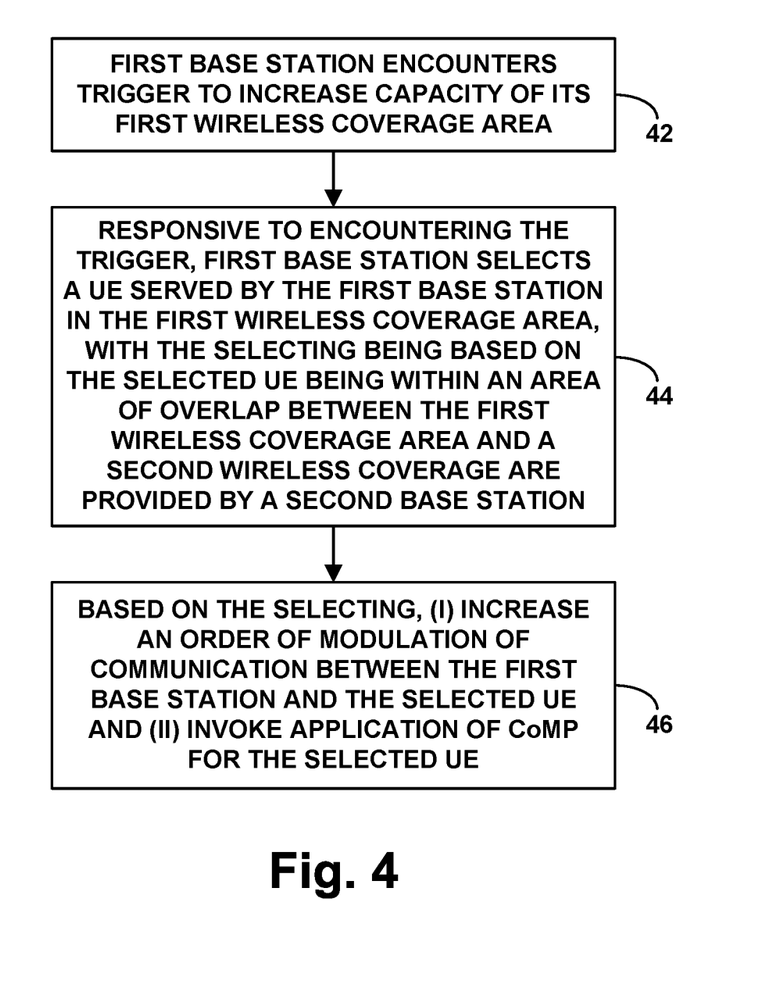
FIG. 4 is another flow chart depicting operations that can be carried out in accordance with the disclosure.

FIG. 4 is next another flow chart depicting an example method operable by a first base station to manage capacity of a first wireless coverage area provided by a first base station. As shown in FIG. 4, at block 42, the method involves the first base station encountering a trigger to increase capacity of the first wireless coverage area. At block 44, the method then involves, responsive to encountering the trigger, the first base station selecting a UE served by the first base station in the first wireless coverage area, with the selecting being based on the selected UE being within an area of overlap between the first wireless coverage area and a second wireless coverage are provided by a second base station. And at block 46, the method involves, based on the selecting, (i) increasing an order of modulation of communication between the first base station and the selected UE and (ii) invoking application of coordinated multipoint communication (CoMP) for the selected UE.

Here, as in the discussion above, encountering the trigger to increase capacity of the first wireless coverage area could take various forms, such as encountering a trigger to improve air interface communication between the first base station and a second UE also served by the first base station in the first wireless coverage area. For instance, encountering the trigger could involve learning (e.g., through deep packet inspection) that the second UE is not being served with sufficiently high data rate or that the second UE is engaged in a particular type of communication such as VoIP communication, or, if the second UE is engaged in a VoIP communication, receiving directly or indirectly from a VoIP call server (e.g., an IMS) a signal indicating that the second UE is not being served with a sufficiently high data rate. Still alternatively, encountering the trigger could take other forms, such as determining that the first wireless coverage area is threshold loaded.

Figure 5:
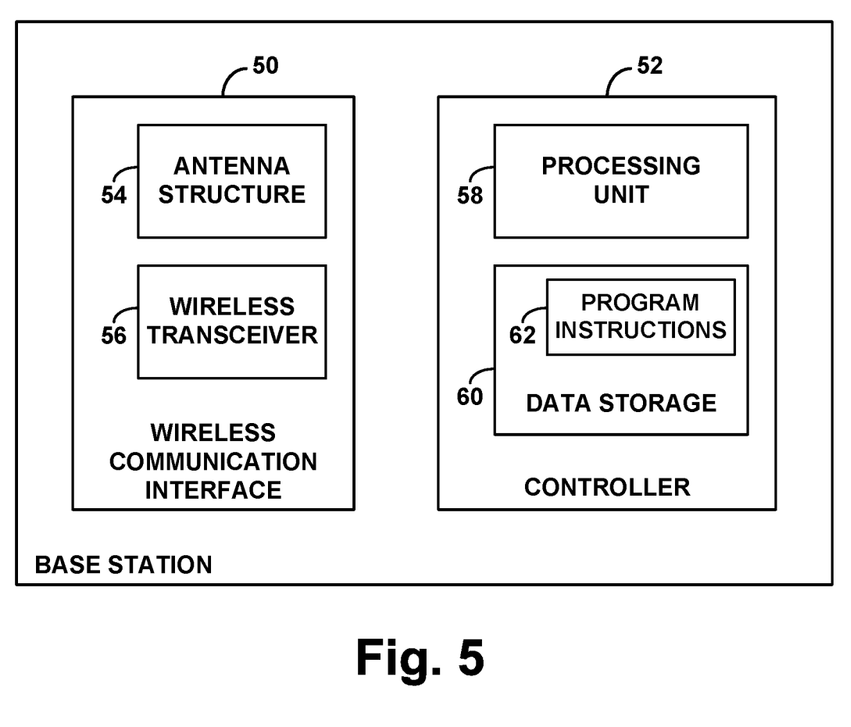
FIG. 5 is a simplified block diagram of a base station operable in accordance with the disclosure.

Finally, FIG. 5 is a simplified block diagram of an example base station operable to carry out various features described above. This base station could generally take any of a variety of forms, including, for instance, a macro base station, a small cell base station, a relay base station, a femto base station, or the like. As shown, the example base station includes a wireless communication interface 50 and a controller 52.

The wireless communication interface 50 may include an antenna structure 54 and wireless transceiver 56 and is operable to provide a first wireless coverage area in which to serve UEs and thus to communicate over an air interface of the coverage area as discussed above. Controller 52 may then comprise a processing unit (e.g., one or more microprocessors or other types of processors) 58, data storage (e.g., one or more volatile and/or non-volatile non-transitory storage components, such as optical, magnetic, or flash storage) 60, and program instructions 62 stored in the data storage and executable by the processing unit to carry out operations such as those discussed above while the base station is serving a plurality of UEs over the air interface.

Exemplary embodiments have been described above. Those skilled in the art will understand, however, that changes and modifications may be made to these embodiments without departing from the true scope and spirit of the invention.

We claim:

1. In a wireless communication system comprising a first base station that provides a first wireless coverage area, and a second base station that provides a second wireless coverage area partially overlapping with the first wireless coverage area, a method for managing capacity of the first wireless coverage area, the method comprising:

determining that a user equipment device (UE) served by the first base station is located where the first wireless coverage area partially overlaps with the second wireless coverage area, wherein channel quality reported by the UE to the first base station maps to a first modulation and coding scheme (MCS) for data communication between the first base station and the UE;

based at least in part on the determining that the UE served by the first base station is located where the first wireless coverage area partially overlaps with the second wireless coverage area, increasing an order of modulation of data communication between the first base station and the UE, wherein increasing the order of modulation of data communication between the first base station and the UE comprises using a second MCS instead of the first MCS for data communication between the first base station and the UE, the second MCS being higher order than the first MCS, whereby increasing the order of modulation may help to free up air interface resources of the first wireless coverage area by using fewer air interface resources of the first wireless coverage area to carry a given quantity of data between the first base station and the UE; and in view of the increase in order of data modulation between the first base station and the UE when the UE is located where the first wireless coverage area overlaps with the second wireless coverage area, applying, by the first base station, coordinated multipoint communication (CoMP) for the UE, whereby applying CoMP for the UE may help to improve communication between the first base station and the UE.

2. The method of claim 1, wherein applying CoMP for the UE comprises making use of the second base station to communicate with the UE concurrently with the first base station communicating with the UE.

3. The method of claim 1, wherein the UE is a first UE, the method further comprising carrying out the determining and increasing in response to a decision to increase capacity of the first wireless coverage area to facilitate improved communication between the first base station and a second UE.

4. The method of claim 3, wherein the decision to increase capacity of the first wireless coverage area to facilitate improved communication between the first base station and the second UE is in response to at least a determination that a data rate with which the second UE is being served is threshold low.

5. The method of claim 4, further comprising performing by the first base station deep packet inspection on packet data flowing to or from the second UE, to determine that the data rate with which the second UE is being served is threshold low.

6. The method of claim 4, further comprising receiving by the first base station a signaling message indicating that the data rate with which the second UE is being served is threshold low.

7. The method of claim 3, wherein the decision to increase capacity of the first wireless coverage area to facilitate improved communication between the first base station and the second UE is in response to at least a determination that the second UE is engaged in a particular type of data communication.

8. The method of claim 3, wherein the decision to increase capacity of the first wireless coverage area to facilitate improved communication between the first base station and the second UE is in response to at least a determination that the second UE is engaged in a voice over Internet Protocol (VoIP) call.

9. A method operable by a first base station to manage air interface capacity in a first wireless coverage area provided by the first base station, the method comprising:

encountering a trigger by the first base station to increase capacity of the first wireless coverage area;

responsive to encountering the trigger, selecting by the first base station a user equipment device (UE) served by the first base station in the first wireless coverage area, wherein the selecting is based on the selected UE being within an area of overlap between the first wireless coverage area and a second wireless coverage are provided by a second base station, and wherein channel quality reported by the UE to the first base station maps to a first modulation and coding scheme (MCS) for data communication between the first base station and the UE; and based on the selecting, (i) increasing an order of modulation of communication between the first base station and the selected UE and (ii) invoking application of coordinated multipoint communication (CoMP) for the selected UE, wherein increasing the order of modulation of communication between the first base station and the UE comprises using a second MCS instead of the first MCS for communication between the first base station and the UE, the second MCS being higher order than the first MCS.

10. The method of claim 9, wherein the UE is a first UE, wherein the first base station also serves a second UE in the first wireless coverage area, and wherein encountering the trigger to increase capacity of the first wireless coverage area comprises encountering a trigger to improve air interface communication between the first base station and the second UE.

11. The method of claim 10, wherein encountering the trigger to improve air interface communication between the first base station and the second UE comprises determining that a data rate with which the second UE is being served is threshold low.

12. The method of claim 11, wherein the second UE is engaged in voice over Internet Protocol (VoIP) communication, and wherein determining that the data rate with which the second UE is being served is threshold low comprises receiving from a VoIP call server a signal indicating that the data rate with which the second UE is being served is threshold low.

13. The method of claim 11, wherein determining that the data rate with which the second UE is being served is threshold low is based on deep packet inspection of packet data flowing to or from the second UE.

14. The method of claim 10, wherein encountering the trigger to improve air interface communication between the first base station and the second UE comprises determining that the second UE is engaged in a particular type of communication.

15. The method of claim 14, wherein the particular type of communication is voice over Internet Protocol (VoIP) communication.

16. The base station of claim 15, wherein the UE is a first UE wherein the base station also serves a second UE in the first wireless coverage area, and wherein encountering the trigger to increase capacity of the first wireless coverage area comprises encountering a trigger to improve air interface communication between the base station and the second UE.

17. The base station of claim 16, wherein encountering the trigger to improve air interface communication between the base station and the second UE comprises determining that a data rate with which the second UE is being served is threshold low.

18. The base station of claim 16, wherein encountering the trigger to improve air interface communication between the base station and the second UE comprises determining that the second UE is engaged in voice over Internet Protocol (VoIP) communication.

19. A base station comprising:
   a wireless communication interface comprising an antenna structure and wireless transceiver, operable to provide a first wireless coverage area in which to serve user equipment devices (UEs); and
   a controller comprising a processing unit programmed with instructions executable to cause the base station to carry out operations comprising:
      encountering a trigger to increase capacity of the first wireless coverage area,
      responsive to encountering the trigger, selecting a UE served by the base station in the first wireless coverage area, wherein the selecting is based on the selected UE being within an area of overlap between the first wireless coverage area and a second wireless coverage, and wherein channel quality reported by the UE to the base station maps to a first modulation and coding scheme (MCS) for data communication between the base station and the UE, and
      based on the selecting, (i) increasing an order of modulation of communication between the base station and the selected UE and (ii) invoking application of coordinated multipoint communication (CoMP) for the selected UE,
      wherein increasing the order of modulation of communication between the base station and the UE comprises using a second MCS instead of the first MCS for communication between the base station and the UE, the second MCS being higher order than the first MCS.

* * * * *